United States Patent
Tamura et al.

(10) Patent No.: US 6,405,121 B2
(45) Date of Patent: Jun. 11, 2002

(54) CONTROL OF INCOMPATIBLE TORQUE REQUESTS IN VEHICLE SPEED CONTROL

(75) Inventors: Minoru Tamura; Hideaki Inoue, both of Yokohama; Naoki Maruko, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/789,012

(22) Filed: Feb. 21, 2001

(30) Foreign Application Priority Data

Feb. 21, 2000 (JP) .......................... 2000-043398

(51) Int. Cl.[7] ................................ B60T 8/32
(52) U.S. Cl. ........................... 701/96; 701/70; 701/93; 701/301; 180/170; 340/435; 340/903
(58) Field of Search ............................. 701/93, 96, 98, 701/23, 70, 78, 87, 84, 301; 180/170; 340/903, 435, 436; 342/70

(56) References Cited

U.S. PATENT DOCUMENTS 5,529,139 A * 6/1996 Kurahashi et al. .......... 180/169
6,175,799 B1 * 1/2001 Tsutsumi et al. ............. 701/96

FOREIGN PATENT DOCUMENTS

| JP | 6-24302 | 2/1994 |
| JP | 7-144588 | 6/1995 |
| JP | 10-114237 | 5/1998 |

OTHER PUBLICATIONS

U.S. application No. 09/640,792, filed Aug. 18, 2000, Naoki Maruko et al.

* cited by examiner

Primary Examiner—Yonel Beaulieu
(74) Attorney, Agent, or Firm—Foley & Lardner

(57) ABSTRACT

A system and method for controlling speed of a vehicle include determining whether or not a stand-by braking torque is applied, determining an actual distance from a preceding vehicle in front of a vehicle, comparing the actual distance to a desired distance to determine whether the actual distance is greater than the desired distance, determining motor/engine torque to increase vehicle speed, and applying the motor/engine torque when the actual distance is greater than the desired distance. The system and method terminates application of stand-by braking torque upon receiving operator torque request.

24 Claims, 9 Drawing Sheets

CONTROL OF INCOMPATIBLE TORQUE REQUESTS IN VEHICLE SPEED CONTROL

BACKGROUND OF THE INVENTION

The present invention relates to a system and method for controlling speed of a vehicle.

To enhance safety of a car and passengers in present-day road traffics, efforts are being made to support the operator in routine driving operations.

In this direction, antilock braking systems (ABS) have been proposed and adopted to enhance longitudinal vehicle stability in dynamically critical conditions in braking process.

"Automatic distance regulation" (ADR) systems have been proposed that are intended to detect and carry out a controlled braking action to control the distance of a vehicle from other vehicles and/or stationary objects in the direction of vehicle motion. JP-A 7-144588 discloses a system whereby traveling speed and deceleration of a vehicle in front are determined using a Doppler sensor and a vehicle speed sensor, which are on a vehicle to be controlled, and a desired distance from the vehicle in front is determined in response comparison of the traveling speed of the vehicle in front with a predetermined value of 15 km/h. In this system, a driver is warned and an automatic braking action is initiated if the distance from the vehicle in front becomes less than the desired distance. JP-A 10-114237 discloses a technique to release ADR in response to operator acceleration request for passing a preceding vehicle in front without relying on detection of accelerator pedal position. Using a predetermined characteristic curve, a throttle position is estimated from a present position of the throttle actuator. The operator acceleration request is detected after comparison of a deviation of the actual throttle position from the estimated throttle position with a threshold value. The deviation becomes zero when the accelerator pedal is released, but the deviation exceeds the threshold value when the accelerator pedal is depressed.

Other systems have been proposed that are intended to initiate braking action before the operator of a vehicle initiates braking action. JP-A 6-24302 discloses a system whereby, when a foot of the operator leaves an accelerator pedal, two micro switches are both closed to energize a solenoid for activating a brake pedal. Energizing the solenoid pulls the brake pedal to partially activate a braking system before the foot of the operator is stepped on the brake pedal.

SUMMARY OF THE INVENTION

Commonly assigned co-pending U.S. patent application Ser. No. 09/640,792 filed on Aug. 18, 2000 discloses a preview brake control system for assisting vehicle operator braking action. For assisting vehicle operator braking action, a detection sub-system on a vehicle to be controlled detects obstacles, which are in or near the direction of motion of the vehicle, and provides corresponding environmental data to a brake controller. In addition, the vehicle has vehicle condition sensors for detecting parameters indicative of the condition or state of motion of the vehicle and transmitting corresponding data to the controller, and vehicle operator demand sensors for detecting parameters indicative of power or brake demand of the operator and transmitting corresponding data to the controller. From the data reported concerning the obstacles, the vehicle condition parameters and the operator demand parameters, the controller ascertains whether or not there is a need for operator braking action. The controller determines a stand-by braking torque in terms of a brake pressure and generates a braking signal for a braking sub-system or braking device to apply the stand-by braking torque to at least one or wheels of the vehicle. As sensors for detection of the obstacles located in or near the direction of motion of the vehicle, conventional radar sensors employing laser, whose application is familiar to those skilled in the art, are used. However, any other types of sensors that permit an adequate preview of the range of motion of the vehicle and which are suitable for service under rough vehicle condition may be used. For full description of the preview brake control system, U.S. patent application Ser. No. 09/640,792, which has its corresponding European Patent Application No. 00307108.1 filed on Aug. 18, 2000, has been hereby incorporated by reference in its entirety.

If both the preview brake control system and an ADR system are installed in a vehicle, there would be a need to avoid application of an additional torque (positive torque) to a wheel or wheels of a vehicle when a stand-by braking torque (negative torque) is applied to the wheels. Application of the stand-by braking torque continues for a predetermined time since determination of a need for operator braking action. Let us consider the case where immediately after the vehicle has approached a preceding vehicle, the stand-by braking torque is applied corresponding to a need for vehicle operator braking action. Under this condition, the ADR system is put into operation before the preceding vehicle shifts to the next lane. Then, the ADR system requests an additional torque to increase speed of the vehicle toward a set cruising speed because the lane has been cleared. If the additional torque is applied immediately to wheel or wheels of the vehicle against the stand-by braking torque, there may occur shocks when the stand-by braking torque disappears upon elapse of the predetermined time. Such shocks are objectionable to the operator.

There would be another need to terminate application of a stand-by braking torque in response to vehicle operator acceleration request for passing a preceding vehicle by shifting to the next lane after having approached to the preceding vehicle quickly enough to initiate application of the stand-by braking torque.

It is an object of the present invention to provide a system and method for controlling speed of a vehicle, which has met at least one of the above-mentioned needs.

In carrying out the above object and other objects, advantages, and features of the present invention, a system for controlling speed of a vehicle is provided, which comprises a prime mover coupled to at least one wheel of the vehicle for applying a positive torque to the at least one wheel in response to an accelerating signal; and a controller having a control logic for determining an actual distance from a preceding vehicle in front, comparing the actual distance to a set desired distance to determine whether the actual distance is greater than the desired distance, determining whether or not a stand-by braking torque is applied to the at least one wheel, determining an additional torque requested by an automatic distance regulation (ADR) to increase vehicle speed when the actual distance is greater than the desired distance and the stand-by braking torque is not applied, and generating an accelerating signal for the prime mover to apply the additional torque to the at least one wheel.

BRIEF DESCRIPTION OF THE DRAWINGS

Further objects and advantages of the invention will be apparent from reading of the following description in conjunction with the accompanying drawings.

BEST MODES FOR CARRYING OUT THE INVENTION

Figure 1:
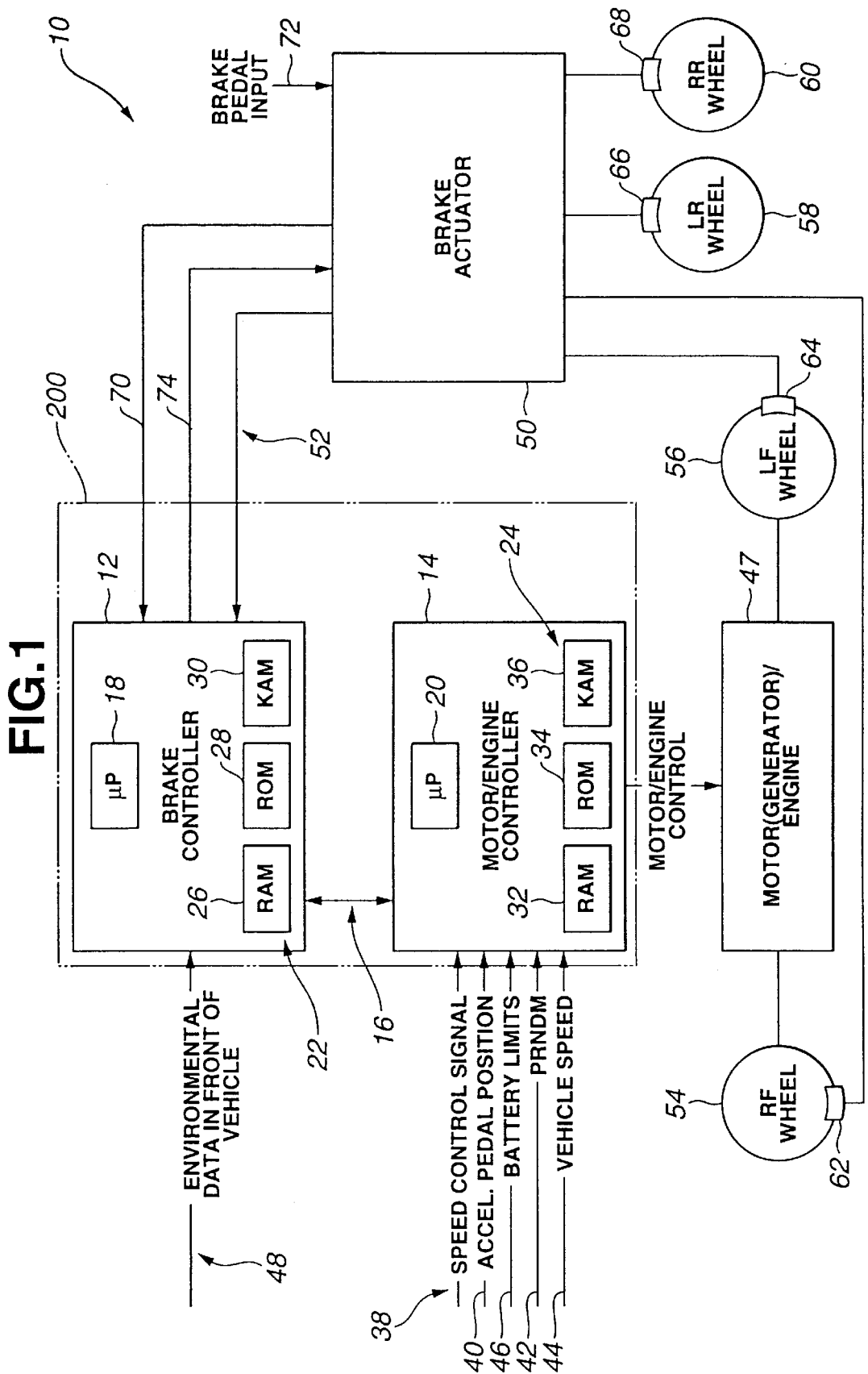
FIG. 1 is a block diagram illustrating a system or method for controlling incompatible torque requests, one for braking torque (negative torque) and the other for additional torque (positive torque), according to the present invention.

Referring now to FIG. 1, a block diagram illustrating operation of a system or method for controlling speed of a vehicle according to the present invention is shown. System 10 preferably includes a first controller 12, such as a brake controller, in communication with a second controller 14 via an appropriate communication link 16. Second controller 14 is preferably an engine controller, Communication link 16 preferably conforms to an intra-controller bus standard, but is at least capable of exchanging information and commands relative to present operating conditions and control of the vehicle. Depending upon the particular application, second controller 14 may be either an engine controller, such as used for internal combustion engines, or a motor controller, such as used for electric or fuel cell vehicles. Similarly, controller 14 may be used to control a hybrid system which utilizes one or more types of prime movers to power the drive train of a vehicle.

In one preferred embodiment of the present invention, controllers 12 and 14 comprise microprocessor-based controllers with associated microprocessors, represented by reference numerals 18 and 20, respectively. Microprocessors 18 and 20 communicate with associated computer-readable storage media 22 and 24, respectively. As will be appreciable by one of ordinary skill in the art, computer-readable storage media may include various devices for storing data representing instructions executable to control braking, engine, or motor systems. For example, computer-readable storage medium 22 may include a random access memory (RAM) 26, a read-only memory 28, and/or a keep-alive memory (KAM) 30. Computer-readable storage medium 24 may include a random access memory (RAM) 32, a read-only memory (ROM) 34, and/or keep-alive memory (KAM) 36. These functions may be carried out through any of a number of known physical devices including EPROM, EEPROM, flash memory, and the like. The present invention is not limited to a particular type of computer-readable storage medium, examples of which are provided for convenience of description only.

Controllers 12 and 14 also include appropriate electronic circuitry, integrated circuits, and the like to effect control of the braking, engine, or motor systems. As such, controllers 12 and 14 are used to effect control logic implemented in terms of software (instructions) and/or hardware components, depending upon the particular application. Details of control logic implemented by controllers 12 and 14 are provided with reference to FIGS. 2, 3, and 8.

Controller 14 receives various signals from sensors to monitor present operating conditions of the vehicle. For example, signals may include cruise control signals, indicated generally by reference numeral 38, an accelerator pedal position signal 40, a gear selector signal 42, and a vehicle speed signal 44. The cruise control signals represent a set cruise speed, a set desired vehicle-to-vehicle distance, and an ON/OFF position of an automatic distance regulation (ADR) switch. Depending upon the particular application, additional signals may be provided, such as battery limit signal 46. Controller 14 may be in direct communication with associated sensors, switches, and other input devices or may receive information relative to sensed parameters via another controller, such as controller 12. Controller 14 receives environmental data in front of the vehicle from controller 12. Controller 14 may be in direct communication with a detection system or unit to receive such environmental data. In operation of automatic distance regulation (ADR) initiated by turning on ADR switch, signals representing the environmental data are processed by controller 14 to determine an actual distance from a preceding vehicle in front for comparison with a set desired distance. Controller 14 compares the actual distance to the set desired distance. If the actual distance is greater than the set desired distance, additional engine/motor torque is determined or requested. The additional torque is then applied to the associated wheel or wheels of the vehicle. For internal combustion engine applications, additional torque is typically provided by controlling the quantity of fuel delivered to an engine 47 or controlling the opening of the engine throttle. For electric vehicles, additional torque may be provided by increasing the energy available to a motor/generator 47. Of course, for hybrid vehicles, additional torque may be provided by an internal combustion engine in combination with an associated traction motor. When actual distance becomes less than the set desired distance, a negative or braking torque is required to reduce speed of the vehicle to maintain the set desired distance. Controller 14 attempts to reduce the vehicle speed by reducing the corresponding torque provided by the motor and/or engine 47 of the vehicle. When the engine and/or motor torque has been reduced to its minimum level, controller 14 determines whether additional braking torque is required. If additional braking torque is required, controller 14 determines a braking torque and generates a braking torque request to brake controller 12. If no preceding vehicle is available, controller 14 compares an actual vehicle speed to a set cruise vehicle speed and controls application of positive or negative torque to at least one wheel of the vehicle.

In one embodiment of the present invention, controller 12 is in direct communication with the detection system to receive environmental data, indicated generally by reference numeral 48, in front of the vehicle. Signals 48 are processed by controller 12 to determine an actual distance from obstacle located in the direction of the vehicle.

Brake controller 12 preferably receives inputs from a braking system or brake actuator 50 indicative of present operating conditions of the braking system. For example, controller 12 may receive brake system pressures 52 indicative of a pneumatic or hydraulic pressure for operating one or more braking devices, which may include any device that applies a negative torque to wheels 54, 56, 58, and 60. A braking device includes various types of friction brakes, such as disk brakes 62, 64, 66, and 68 or drum brakes. Controller 12 receives a signal indicative of brake pedal position as represented by reference numeral 70. Alternatively, brake pedal position signal 70 may be provided directly from a sensor associated with a brake pedal or may be provided indirectly through brake actuator 50. For conventional hydraulic or pneumatic braking systems, a brake pedal input 72 provides a fluid coupling between the associated brake pedal and brake actuator 50. This fluid signal may be converted to an appropriate electrical signal to provide the brake pedal position signal 70.

Brake controller 12 processes the signals received from various sensors and messages from controller 14, which include a braking torque request from controller 14. Controller 12 generates braking commands or signals for application of at least one of friction brakes 62, 64, 66, and 68.

In operation, system 10 receives the environmental data from the detection system, vehicle speed signal 44, brake pedal position signal 70, accelerator pedal position signal 40 to determine whether or not there is a need for operator braking action. Brake controller 12 may make this determination. When there is a need for operator braking action, controller 12 determines a stand-by braking torque. Various manners of determining whether or not there is a need for operator braking action are disclosed in the incorporated U.S. patent application Ser. No. 09/640,792 as well as several variations in determining a stand-by braking torque.

Figure 2:
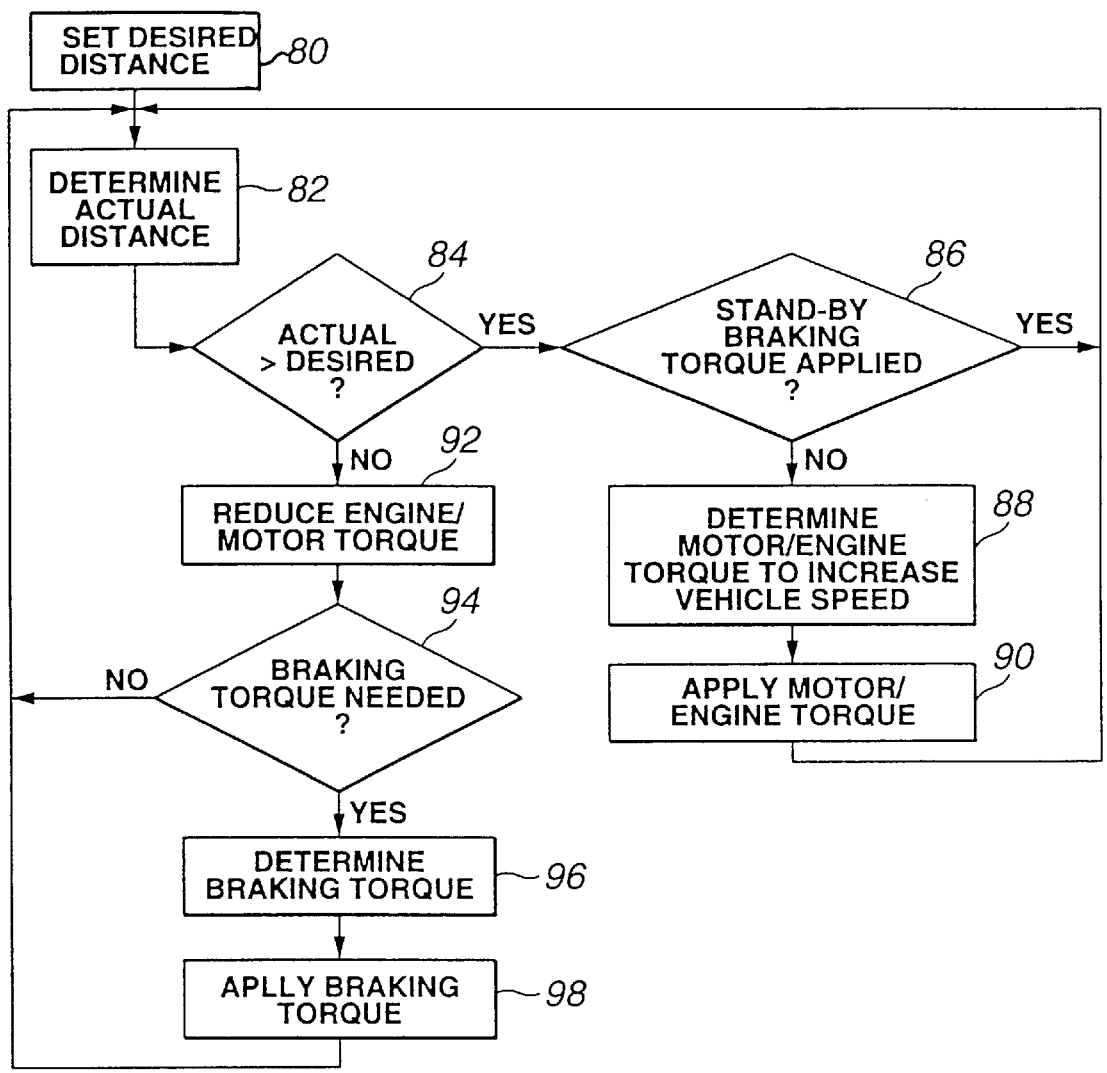
FIG. 2 is a flowchart illustrating control logic for one embodiment of the present invention in a vehicle.
Figure 3:
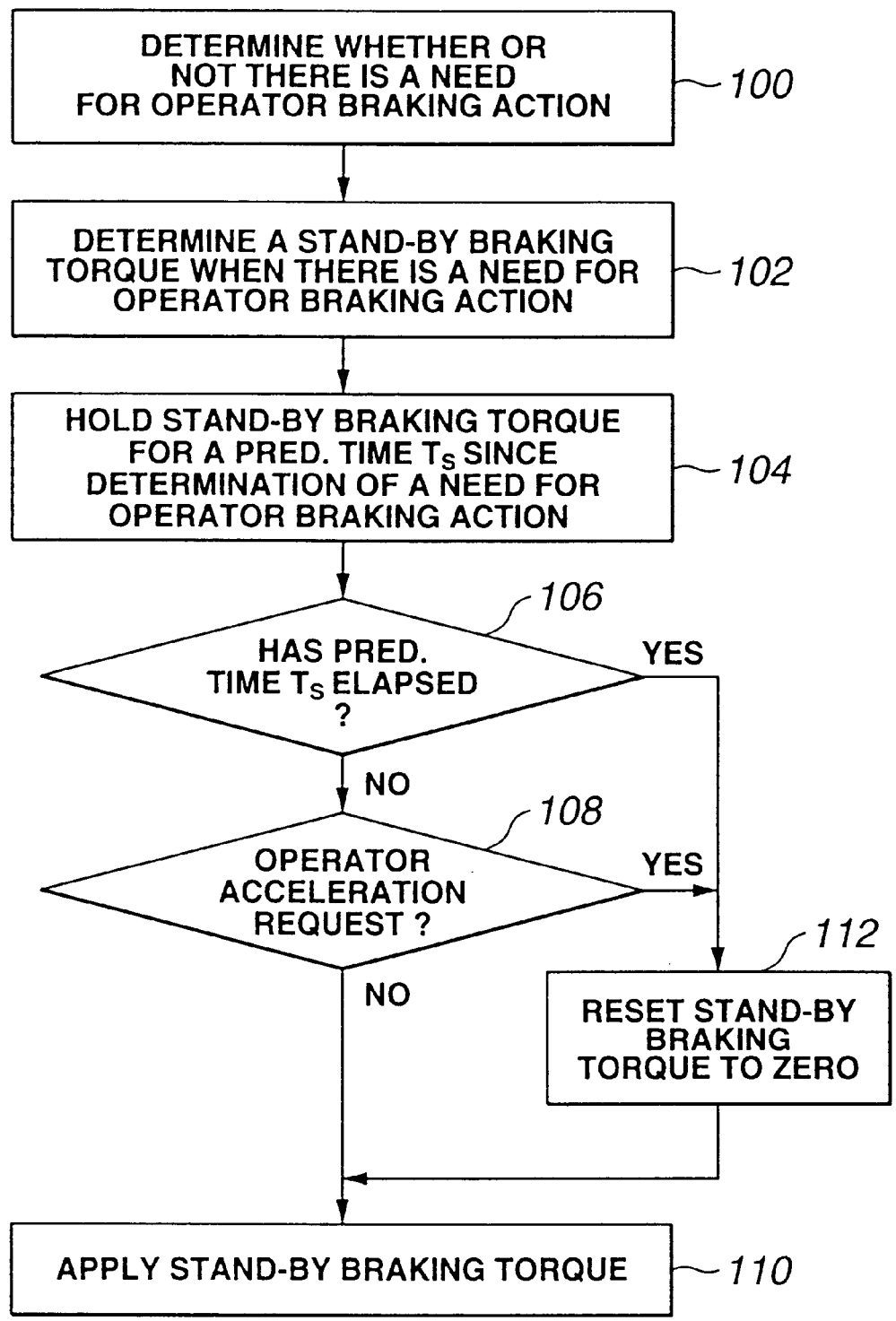
FIG. 3 is a flowchart illustrating control logic for another embodiment of the present invention in a vehicle.
Figure 7:
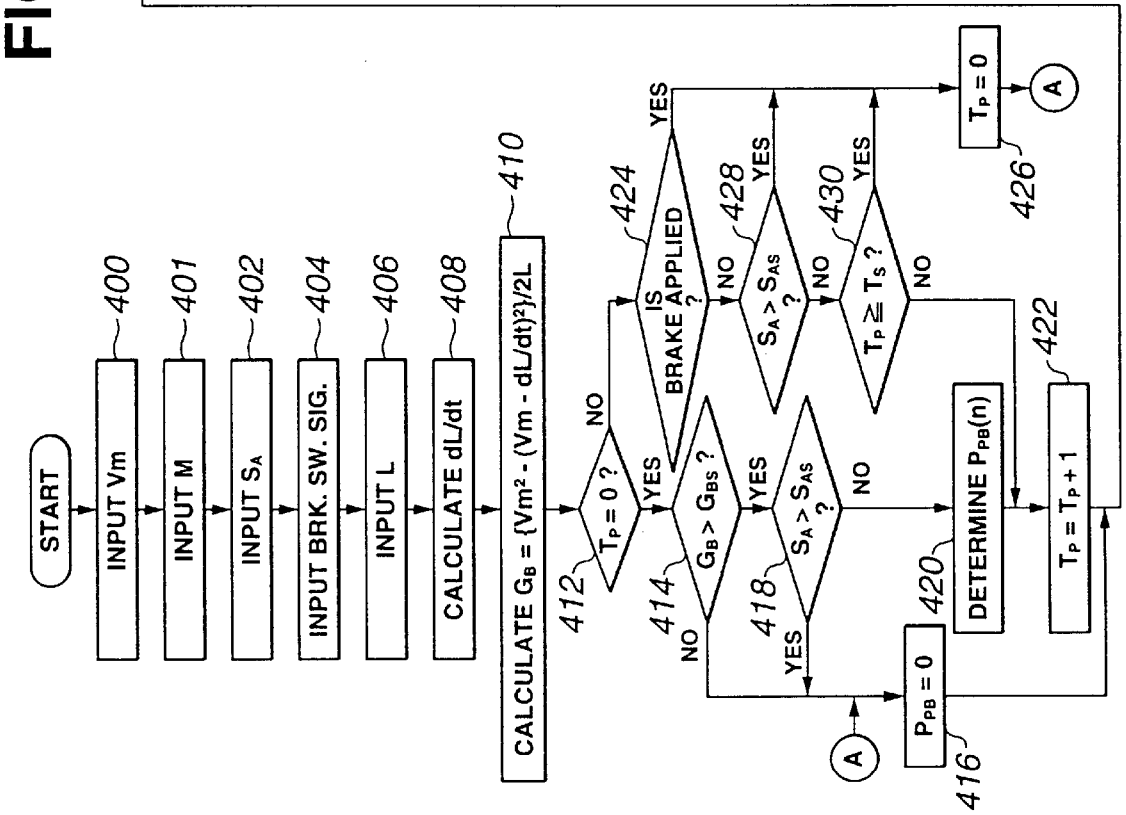
FIG. 7 is a flowchart illustrating operation of a system and method according to the present invention.

Referring now to FIG. 2, a flowchart illustrating control logic of one embodiment of the present invention is shown. As will be appreciated by one of ordinary skill in the art, the flowcharts illustrated in FIGS. 2, 3, and 7 may represent any of a number of processing strategies which may include event-driven, interrupt-driven, multi-tasking, multi-threading, and the like. As such, various steps or functions illustrated may be performed in the sequence shown, in parallel, or in some cases omitted. Likewise, the order of processing is not necessarily required to achieve the objects, features, and advantages of the present invention, but is provided for ease of illustration and description only. Preferably, the control logic illustrated in FIGS. 2, 3, and 7 is implemented primarily in software, which is executed by one or more microprocessor-based controllers. Of course, the control logic may be implemented in software, hardware, or a combination of software and hardware, depending upon the particular application.

The flowchart of FIG. 2 illustrates control logic for one embodiment of the present invention in a vehicle having a conventional friction braking system that is directly controlled by the vehicle operator via an associated brake pedal. A target or desired so-called "vehicle-to-vehicle" distance is determined as represented by block 80 as well as a target or desired so-called cruising vehicle speed. The desired distance and cruising vehicle speed may be indicated by the vehicle operator via an appropriate switch, such as an ADR switch or a cruise control set speed and distance switch.

The actual distance from a preceding vehicle is then determined as represented by block 82. The actual distance may be determined by an associated detection system employing a laser radar. The actual distance is compared to the desired distance to generate a corresponding distance error as represented by block 84. If the distance error falls within predetermined limits, a torque correction or adjustment is not required and control returns back to block 82. If the actual distance is greater than the desired distance, it is determined whether or not stand-by braking torque is applied to associated wheel or wheels of the vehicle as represented by block 86. The application of stand-by braking torque may be determined by communicating with the brake controller 12. If the stand-by braking torque is being applied, control returns back to block 82. If no stand-by braking torque is applied, additional engine/motor torque is requested at indicated by block 88. The additional torque is then applied to associated wheel or wheels as indicated by block 90. For internal combustion engine applications, controlling the quantity of fuel delivered to the engine typically provides additional torque. For electric or hybrid fuel vehicles, increasing the energy available to the motor/generator may provide additional torque. Of course, in combination with an associated traction motor, an internal combustion engine may provide additional torque.

At block 84, when actual distance becomes less than the desired distance by a predetermined amount, a negative or braking torque is required to maintain or control speed of the vehicle. Block 92 attempts to reduce the vehicle speed by reducing the corresponding torque provided by the motor and/or engine of the vehicle. When the engine and/or motor torque has been reduced to its minimum level, which may correspond to idling or fuel cutoff of an internal combustion engine, block 94 determines whether additional braking torque is required. If no additional braking torque is necessary to maintain the desired distance, then control returns to block 82.

If additional braking torque is required as indicated by block 94, block 96 determines a braking torque and generates an appropriate command or braking signal to a braking actuator that controls actual application of braking torque to associated wheel or wheels of the vehicle as represented by block 98. Control then returns back to block 82.

As will be appreciated by one of ordinary skill in the art, the control functions or steps illustrated with respect to FIGS. 2, 3, and 7 are preferably repeated at predetermined time intervals of 10 milliseconds or based upon a predetermined event.

Referring now to FIG. 3, a flowchart illustrating another embodiment of the present invention is shown. Block 100 represents determination whether or not there is a need for operator braking action. This determination may be made as taught by the incorporated U.S. patent application Ser. No. 09/640,792. If there is a need for operator braking action, block 102 determines a stand-by braking torque as a function of the present vehicle speed, which will be later discussed in connection with FIGS. 8 and 9. As represented by block 104, the stand-by braking torque is held for a predetermined period of time Ts, which may be set around 1 second. If, within the predetermined time Ts, there is no operator acceleration request as represented by blocks 106 and 108, an appropriate command or braking signal is kept generated to a braking actuator to apply the stand-by braking torque to associated wheel or wheels of the vehicle as represented by block 110. Then, immediately after elapse of the predetermined time Ts, the stand-by braking torque is reset to zero as represented by block 112. Then, the stand-by braking torque that has been applied disappears.

If the vehicle operator requests acceleration within the predetermined time Ts as represented by block 108, application of stand-by braking torque is terminated as represented by blocks 112 and 110

Figure 4:
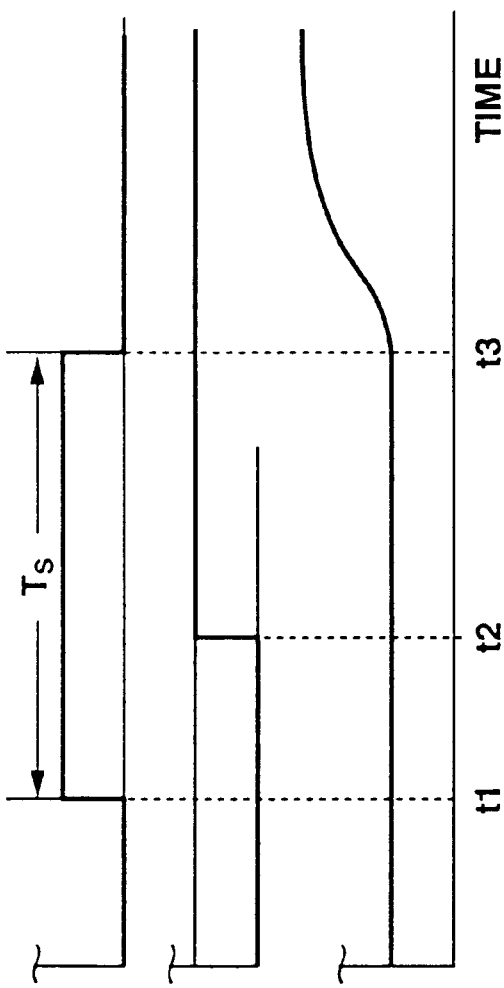
FIGS. 4A, 4B, and 4C, when combined, provide a timing diagram illustrating operation to control the two incompatible torque requests.

Referring to FIGS. 4A, 4B, and 4C, a timing diagram illustrates operation of a system and method according to the present invention, which has been illustrated by the flowchart of FIG. 2.

At moment t1, a need for operator braking action arises, and a stand-by braking torque is applied as illustrated in FIG. 4A. It is assumed that automatic distance regulation (ADR) is put into operation immediately after moment t1. Subsequently, at moment t2 within the predetermined time Ts, a preceding vehicle in front shifts to the next lane and the ADR system requests an additional torque to increase the vehicle speed toward the cruising speed as illustrated in FIG. 4B. However, the additional quantity of fuel or throttle angle corresponding to the additional torque requested by the ADR system is prohibited until elapse of the predetermined time Ts because the stand-by braking torque is applied. At moment t3 upon or immediately after disappearance of the stand-by braking torque, the additional quantity of fuel is delivered to apply the additional torque to wheel or wheels of the vehicle.

Figure 9:
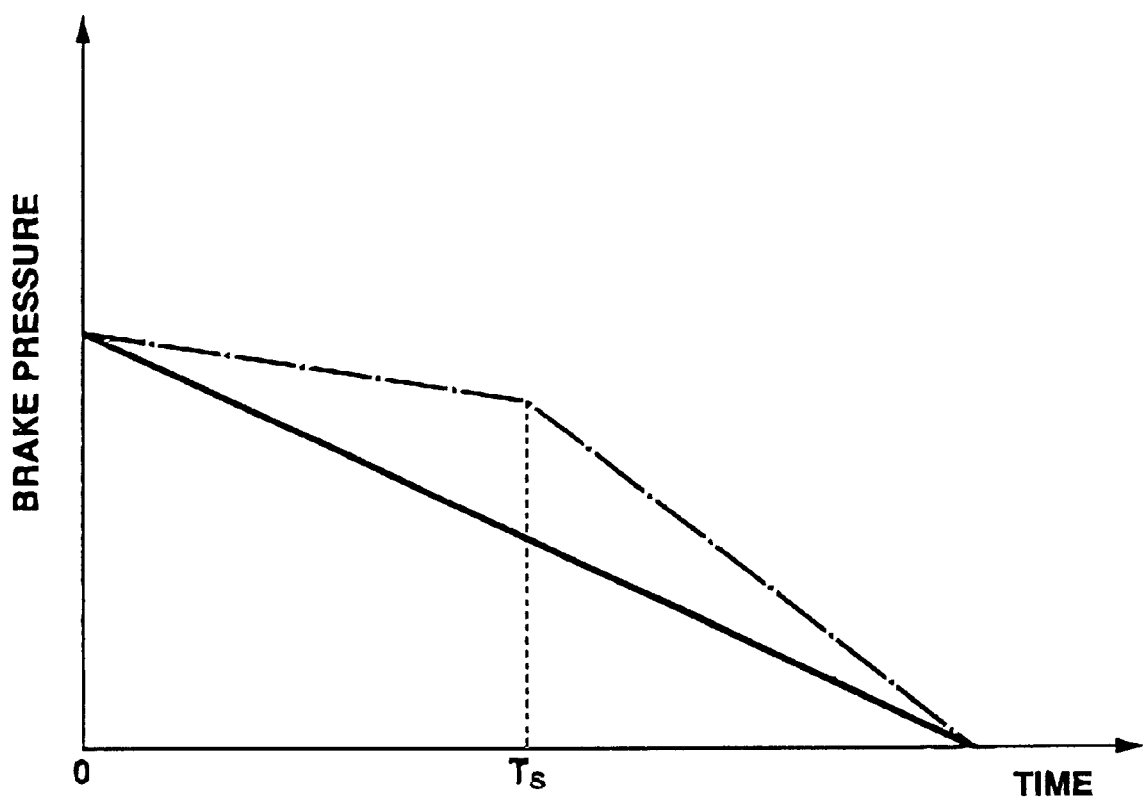
FIG. 9 graphically represents two different manners of gradual reduction of stand-by braking torque after initial determination of a need for operator braking action.

In one embodiment, the stand-by braking torque is invariable over the predetermined time Ts. FIG. 9 provides two different manners of time dependent reduction of level of stand-by braking torque. As illustrated by the fully drawn line in FIG. 9, a stand-by braking torque may be reduced from an initial level or value to zero level at a gradual rate over the predetermined period of time Ts and the extended period of time. Alternatively, as indicated by the one-dot chain line, a stand-by braking torque may be reduced at a first rate over the predetermined period of time Ts and at a second greater rate over the extended period of time. These time dependent variations of stand-by braking torque are advantageous in minimizing shocks upon termination of application of stand-by braking torque.

Figure 5:
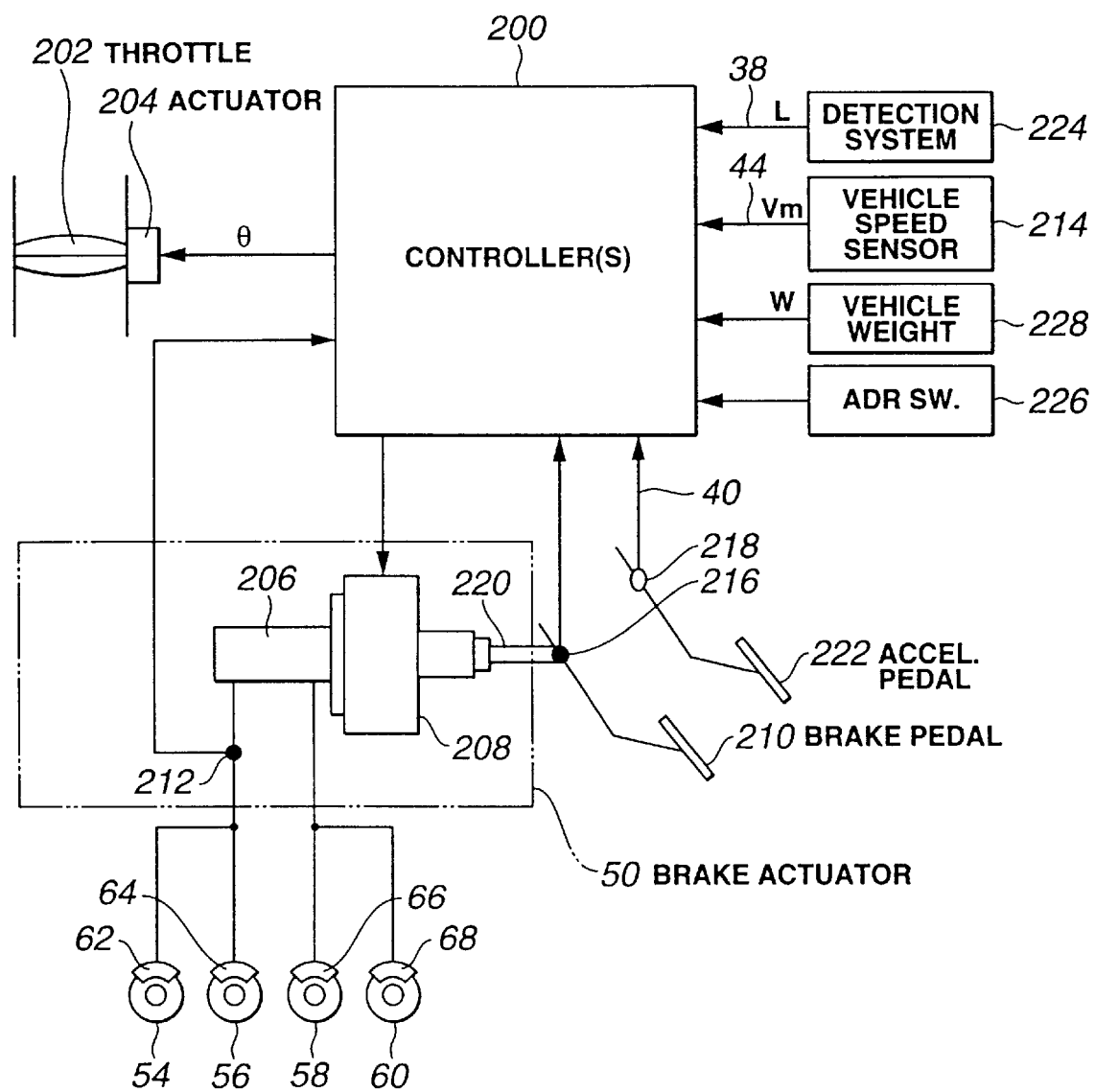
FIG. 5 is a block diagram illustrating a system or method for applying a transition braking torque to at least one wheel of a vehicle that uses a solenoid operated brake booster as a brake actuator.
Figure 6:
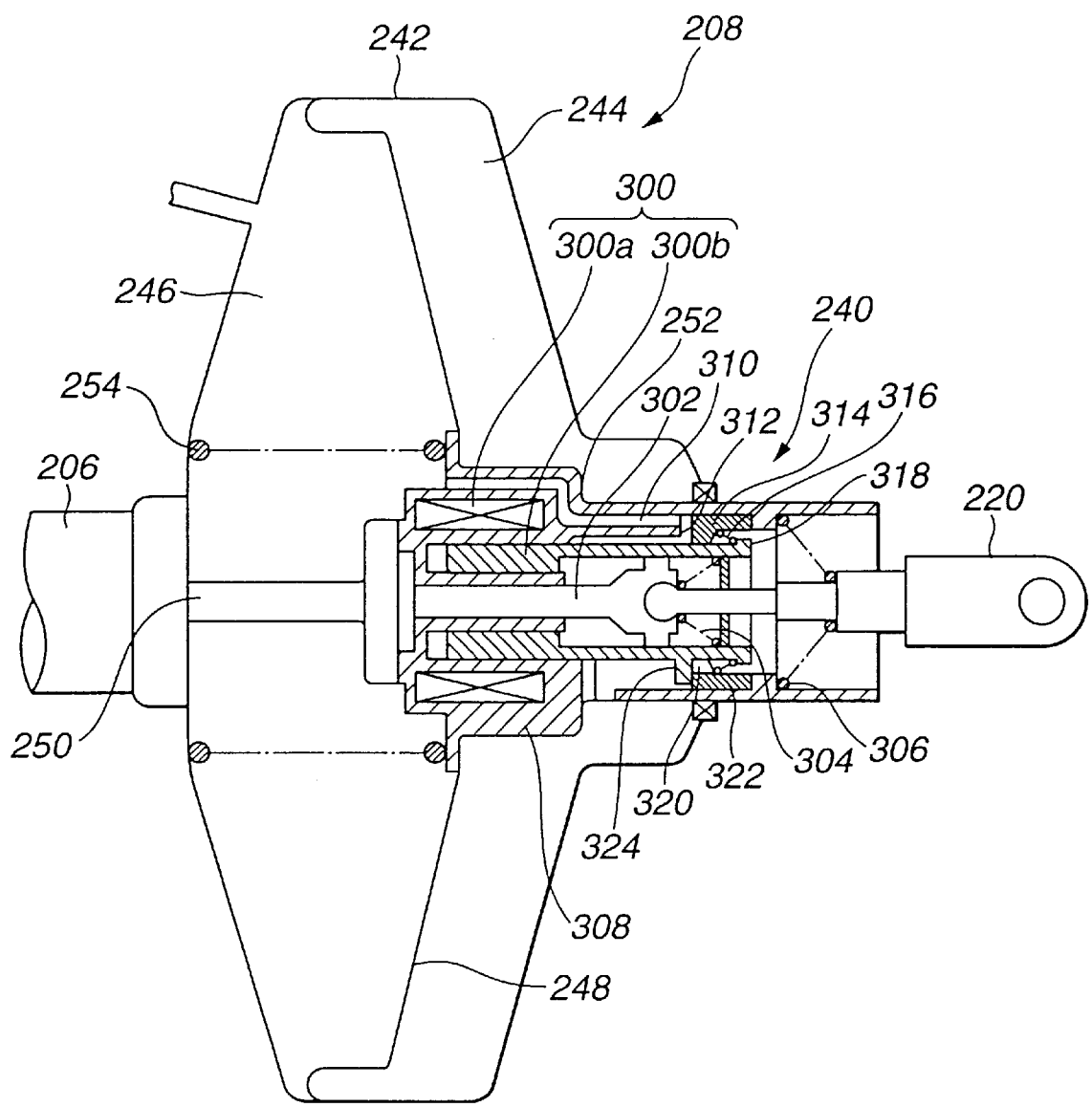
FIG. 6 is a schematic sectional view of the brake booster shown in FIG. 5.

Referring to FIGS. 5, 6, and 7, FIG. 7 is a flowchart, and FIGS. 5 and 6 illustrate hardware.

Referring to FIG. 5, the reference numeral 200 designates controller(s), which correspond to portion in FIG. 1 enclosed by the phantom rectangle. The flowchart of FIG. 7 illustrates control logic in a vehicle having an internal combustion engine with a throttle 202 whose opening angle is adjusted by an actuator 204. The vehicle has a conventional braking system 50 including a master brake cylinder 206 with a brake booster 208 and a brake pedal 210. A brake pressure sensor 212 is provided to detect brake pressure delivered from master cylinder 206 to friction brakes 62 and 64 for front wheels 54 and 56.

Vehicle speed sensor 214 is provided to detect speed Vm of vehicle. A brake switch 216 and an accelerator stroke sensor 218 are provided to sense operator demand. Brake switch 216 is operatively connected to brake pedal 210. Specifically, brake switch 216 is connected to a rod-shaped actuator 220 of brake booster 208. The setting is such that brake switch 216 has an off-state when brake pedal 210 is released and has an on-state when brake pedal 210 is depressed. Accelerator stroke sensor 28 detects instantaneous stroke of an accelerator pedal 222 and generates an accelerator stroke or pedal position signal SA. A detection system 224 includes a distance detection sensor for detecting a distance L from an obstacle, including a preceding vehicle, in front and generates a distance signal. Detection system 224 includes a laser radar or a millimeter wave radar. An ADR switch 226 is provided. The vehicle operator manipulates ADR switch 226 to initiate automatic distance regulation (ADR). The weight M of the vehicle is provided to controller 200 via an appropriate input device as represented by a block 228. The vehicle weight M may be determined by a load sensor utilizing a load sensing valve to measure load on front wheels and load on rear wheels of the vehicle.

Referring to FIG. 6, brake booster 208 includes an electro-magnetically operable control valve arrangement 240. Controller 200 provides braking command or signal to control valve arrangement 240 for adjustment of brake pressure to any desired pressure level. Brake booster 208 comprises an essentially rotation symmetrical housing 242, in which a rear chamber 244 and a front chamber 246 are arranged and separated from each other by a movable wall 248. Control valve arrangement 240 is coupled with movable wall 248 for a common relative movement with respect to housing 242. The front end of rod-shaped actuation member 220, which is coupled with brake pedal 210, acts on control valve arrangement 240.

Within brake booster 208, a power output member 250 is arranged which bears against control valve arrangement 240. Power output member 250 is provided for activation of master brake cylinder 206.

Control valve arrangement 240 comprises an essentially tubular valve housing 252. The front end of valve housing 252 is coupled to movable wall 248. A return spring 254 arranged within brake booster 208 resiliently biases the control valve arrangement 240 rearwardly. Within valve housing 252, an electromagnetic actuator 300 is arranged which includes a solenoid coil 300a and a plunger 300b. Arranged within plunger 300b is an operating rod 302. The front end of operating rod 302 bears against power output member 250. A return spring 304 located within plunger 300b has one end bearing against a retainer (no numeral) fixedly connected to plunger 300b and opposite end bearing against the rear end of operating rod 302. The front ball end of rod-shaped actuator 220 is fixedly inserted into socket recessed inwardly from the rear end of operating rod 302. A return spring 306 located within valve housing 308 has one end bearing against a shoulder of valve housing 308 and opposite end bearing against a shoulder of rod-shaped actuator 220.

Valve housing 308 is formed with a passage 310 through which fluid communication between rear and front chambers 244 and 246 is established. The front end of passage 310 is always open to front chamber 246, while the rear end of passage 310 is located within a valve seat 312. Valve seat 312 is located within an annular space defined between plunger 300b and valve housing 308 and faces a valve member 314 that forms an upper portion of a slide. The slide is located between plunger 300b and valve housing 308. A return spring 316 has one end bearing against an integral abutment 318 of plunger 300b and opposite end bearing against the slide. An air admission port 320 is formed through a lower portion of the slide. This lower portion of the slide serves as a valve seat 322. Port 320 is provided to admit ambient air into rear chamber 244. Valve seat 322 formed with port 320 faces a valve member 324 integral with plunger 300b. Valve seat 312 and valve member 314 cooperate with each other to form an interruption or vacuum valve. Valve seat 322 and valve member 324 cooperate with each other to form an ambient air admission valve.

In the rest position shown in FIG. 6 with the vacuum source disconnected, atmospheric pressure prevails in both chambers 244 and 246. With the vacuum source connected, i.e., with the engine running, a vacuum is built up in front chamber 246 so that movable wall 248 together with the control valve arrangement 240 is slightly displaced in a forward direction. Accordingly, a new pressure balance is achieved between two chambers 244 and 246. From this position, a lost travel free activation of the brake booster 208 is ensured.

Under a normal brake actuation by the vehicle operator, the brake booster 208 operates in a usual manner by interrupting the connection between two chambers 244 and 246 via the interruption valve (312, 314) and admitting ambient air into rear chamber 244 via the ambient air admission valve (324, 322).

Electromagnetic actuator 300 can actuate control valve arrangement 240. For this purpose, current through solenoid 300*a* is regulated in response to braking command furnished by controller 200. This command causes a displacement of control valve arrangement 240 so that ambient air can flow into rear chamber 244.

Referring to FIG. 7, a flowchart illustrates operation of a system and method according to the present invention.

In one embodiment, the flowchart of FIG. 7 is repeated at predetermined intervals of 10 milliseconds.

Blocks 400, 401, 402, 404, and 406 represent input of vehicle speed Vm, vehicle weight M, accelerator pedal stroke $S_A$, brake switch output, and actual distance L from obstacle or preceding vehicle in front, respectively.

Time derivative dL/dt of actual distance L is calculated as represented by block 408. The time derivative dL/dt may be approximated by a difference between the present and previous values of L.

At block 410, using vehicle speed Vm and the time derivative dL/dt, a target deceleration $G_B$ is determined by calculating the equation as follows:

$$G_B = \{Vm^2 - (Vm - dL/dt)^2\}/2L.$$

Block 412 represents determination whether or not timer count $T_P$ is cleared. If $T_P = 0$, control goes to block 414. At block 414, $G_B$ is compared with a predetermined deceleration value $G_{BS}$ in the neighborhood of 6.0 m/sec$^2$ to determine whether $G_B$ exceeds $G_{BS}$. If $G_B \leq G_{BS}$ and thus there is no need for operator braking action, control goes to block 416. At block 416, stand-by brake pressure $P_{PB}$ is reset equal to 0 (zero) before control goes to ADR control beginning with block 434. If $G_B > G_{BS}$ and thus there is a need for operator braking action, control goes to block 418.

Block 418 represents determination whether or not there is an operator acceleration request. This determination is made by comparing accelerator pedal stroke $S_A$ to a predetermined stroke value $S_{AS}$. If $S_A > S_{AS}$ and thus there is an operator acceleration request, control goes to block 416 because the operator acceleration request clearly indicates that the operator has no intention to carry out braking action. If $S_A \leq S_{AS}$ and thus there is no operator acceleration request, control goes to block 420.

Figure 8:
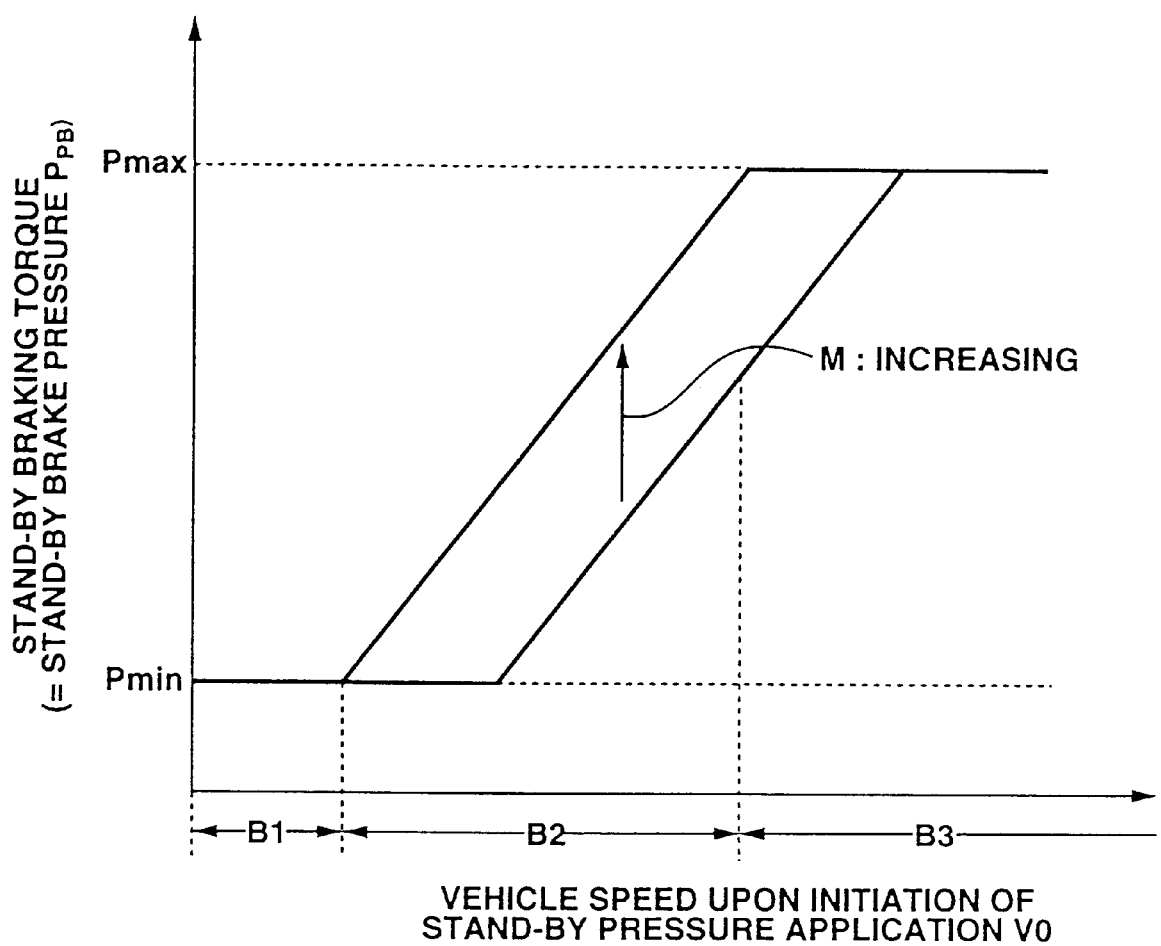
FIG. 8 graphically represents variation characteristic of initial values of braking torque upon determination of a need for operator braking action against vehicle speeds and weights.

At block 420, the present vehicle speed Vm is set as a stand-by braking process initial vehicle speed V0 and determines an initial value of stand-by brake pressure $P_{PB}$ by performing a table look-up operation of maps illustrated in FIG. 8 using vehicle weight M and initial vehicle speed V0. The next block 422 represents increment of timer count $T_P$ by a predetermined unit of 1 (one) before control goes to block 434.

FIG. 8 graphically represents the initial values of stand-by braking torque in terms of brake pressure $P_{PB}$ against the initial vehicle speed V0. With the same brake pressure $P_{PB}$, the higher the initial vehicle speed V0, the less the vehicle operator perceives deceleration. The lower the initial vehicle speed V0, the more the vehicle operator perceives deceleration. Taking these into account, when the initial vehicle speed V0 falls in a lower range B1 and thus is less than a first vehicle speed value, a predetermined lower braking torque value expressed in terms of a predetermined lower brake pressure Pmin is set as an initial value of the stand-by braking torque. When the initial vehicle speed V0 falls in a higher range B3 and thus is greater than a second vehicle speed value, a predetermined higher braking torque value expressed in terms of a predetermined higher brake Pmax is set as an initial value of the stand-by braking torque. The second vehicle speed value is greater than the first vehicle speed value. The predetermined higher brake pressure Pmax is greater than the predetermined lower brake pressure Pmin. When the initial vehicle speed value V0 falls in an intermediate vehicle speed range B2 limited by the first and second vehicle speed values, one of intermediate braking torque values, which fall between the predetermined lower and higher braking torque values, as an initial value of the stand-by braking torque. As shown in FIG. 8, the intermediate braking torque values are represented by a linear function of the initial vehicle speed values V0. At least over a range of initial vehicle speed values that fall between the first and second vehicle speed values (intermediate vehicle speed range B2), the heavier the vehicle weight M, the greater the initial value of the stand-by braking torque is. With the same braking torque, the heavier the vehicle weight M, the less the vehicle operator perceives deceleration.

Turning back to the flowchart of FIG. 7, subsequently after timer count $T_P$ has been incremented at block 422, control goes from block 412 to block 424. Block 424 represents determination whether or not brake pedal 210 is depressed by checking for the output of brake switch 216. If brake pedal 210 is depressed, control goes to block 426. At block 426, timer count $T_P$ is cleared before control goes to block 416. If brake pedal 210 is not depressed or released, control goes to block 428.

Block 428 represents determination whether or not there is an operator acceleration request by comparing accelerator pedal stroke $S_A$ to predetermined value $S_{AS}$. If accelerator pedal 222 is depressed indicating the presence of operator acceleration request, control goes to block 426. This is the case where stand-by braking torque is not needed. If accelerator pedal 222 is not depressed or released, control goes to block 430.

Block 430 represents determination whether or not timer count $T_P$ has reached a predetermined value Ts in the neighborhood of 1 second. If $T_P < Ts$, control goes to block 422 where timer count $T_P$ is increased by 1 (one) before control goes to block 434. If $T_P \geq Ts$, control goes to block 426 and then to block 414 before control goes to block 434.

Block 434 represents determination whether or not ADR switch 226 is turned on. Turning on ADR switch 226 initiates ADR control. If ADR switch 226 assumes OFF state, control goes to block 436. At block 436, a present ADR brake pressure $P_{BC}(n)$ is reset equal to 0 (zero) and an additional throttle command θ is reset equal to 0 (zero) before control goes to block 456. Block 456 represents selection of higher one of $P_{BC}(n)$ and $P_{PB}$ before control goes to block 458. Block 456 represents output of the selected higher one of $P_{BC}(n)$ and PPB, and an additional throttle command θ before control goes to 460. At block 460, the present value $P_{BC}(n)$ is stored as the previous value $P_{BC}(n-1)$ before control returns to start point of the flowchart.

If, at block 434, ADR switch 226 is in ON state, control goes to block 433. Block 433 represents determination whether or not there is an operator acceleration request by comparing accelerator pedal stroke $S_A$ to $S_{AS}$. If accelerator pedal 222 is depressed, control goes to block 435. Block 435 represents release of ADR control by turning off ADR switch and resetting $P_{BC}(n)$ and θ before control goes to blocks 456, 458 and 460. If accelerator pedal 222 is not depressed or released, control goes from block 433 to block 438.

At block 438, it is determined whether actual distance L is less than L1 (L<L1), L is not less than L1 and not greater than L2 (L1≦L≦L2), or L is greater than L2. If L1≦L≦L2, it is determined that actual distance L from a preceding vehicle in front falls in the neighborhood of a desired distance, and control goes to block 436. If L<L1, it is determined that actual distance from the preceding vehicle is too short and control goes to block 440. At block 440, the previous ADR brake pressure $P_{BC}(n-1)$ is increased by a predetermined value $\Delta P_{BC}$ to give the result as present ADR brake pressure $P_{BC}(n)$, and additional throttle command θ is reset equal to 0 (zero). If L>L2, it is determined that actual distance L from the preceding vehicle is too long, and control goes to block 442.

At block 442, present ADR brake pressure $P_{BC}(n)$ is reset equal to 0 (zero) before control goes to block 444. Block 444 represents determination whether or not stand-by brake pressure $P_{PB}$ is 0 (zero). If $P_{PB}>0$, control goes to block 456. If $P_{PB}=0$, control goes to block 446.

At block 446, additional throttle command θ is increased by a predetermined value Δθ before control goes to block 456.

Assuming now that ADR switch 226 is turned off so that ADR control is not in progress, control always goes from block 434 to block 436. Under this condition, the preview brake control only is carried out by performing functions of blocks 400–430, which are disposed upstream of block 434. Assuming also that timer count $T_P$ is cleared ($T_P=0$), the target deceleration $G_B$, calculated at block 410, becomes zero or in the neighborhood of zero in any one of the following cases: 1) there is no preceding vehicle in front; 2) distance from a preceding vehicle is sufficiently great; and 3) a distance from a preceding vehicle is invariable and the preceding vehicle runs at the same speed. Under this condition, control goes from block 414 to block 416 where $P_{PB}$ is reset before control goes to block 434. Since ADR switch 226 is turned off, control goes from block 434 50 block 436 where $P_{BC}(n)$ and θ are reset. Thus, the throttle 202 is adjusted to a position corresponding to the accelerator pedal position set by the vehicle operator.

If distance L from a preceding vehicle becomes short to an extent that $G_B$ exceeds $G_{BS}$, control goes from block 414 to block 418. If, under this condition, the vehicle operator depresses accelerator pedal 222, control goes from block 418 to block 416, and stand-by braking torque is not applied. This is the case where the vehicle operator has intention to continue the present running state.

If, under the condition where $G_B$ exceeds $G_{BS}$, the vehicle operator releases accelerator pedal 222, control goes from block 418 to block 420. This is the case where vehicle operator braking action is imminent so that stand-by braking torque is needed to assist the braking action. At block 420, an appropriate stand-by brake pressure $P_{PB}$ is determined corresponding to initial vehicle speed V0 and vehicle weight M. Since ADR switch 226 is in OFF state, the stand-by brake pressure $P_{PB}$ is selected at block 456 and output at block 458. Current corresponding to the brake pressure $P_{PB}$ flows through solenoid 300a (see FIG. 6), causing application stand-by braking torque to wheels 54-60 of the vehicle prior to the vehicle operator braking action.

Stand-by brake pressure $P_{PB}$ is variable corresponding to vehicle speed V0 and vehicle weight M. The less the initial vehicle speed V0, the less stand-by brake pressure $P_{PB}$ is. The greater the vehicle weight M, the greater stand-by brake pressure $P_{PB}$. Accordingly, the magnitude of stand-by braking torque applied to the vehicle wheels corresponds to vehicle speed and weight, providing any objectionable feel to the vehicle operator.

If the vehicle operator does not depress brake pedal 210 after releasing accelerator pedal 222 due to acceleration of the preceding vehicle or moving off thereof, the application of stand-by braking torque disappears immediately after timer count $T_P$ exceeds Ts. In this regard, it is noted that control goes from block 430 to blocks 426 and 416 to reset timer count $T_P$ and stand-by brake pressure $P_{PB}$ upon elapse of predetermined time Ts.

If, within the predetermined time Ts, the vehicle operator depresses brake pedal 210, the brake switch 216 is turned on. Then, control goes from block 424 to blocks 426 and 416, terminating the preview braking, making a swift shift to ordinary braking.

Referring also to FIGS. 4A, 4B, and 4C, at moment t1, the preview brake control where stand-by brake pressure $P_{PB}$ is applied begins. With brake and accelerator pedals 210 and 222 held released, the vehicle operator turns on ADR switch 226 immediately before moment t2. Then, control goes from block 434 to block 433. Since accelerator pedal 222 is released, control goes from block 433 to block 438.

If, under this condition, the preceding vehicle shifts to the next lane or the vehicle operator shifts to the next lane to pass the preceding vehicle, the actual distance L suddenly becomes greater than L2. Since stand-by brake pressure $P_{PB}$ remains till elapse of the predetermined time Ts, control goes along blocks 438, 442, 444, and 456. Although potential additional torque request appears at moment t2, the stand-by brake pressure $P_{PB}$ remains and no additional torque corresponding to the potential additional torque request is applied to the vehicle wheels until elapse of the predetermined time Ts.

Immediately after moment t3 upon elapse of the predetermined time Ts, control goes from block 430 to blocks 426 and 416, terminating preview brake control. Then, control goes from block 444 to block 446, generating additional torque corresponding to the additional torque request. Thus, as illustrated in FIG. 4C, the throttle angle is increased to increase the vehicle speed toward the set cruising speed. In this manner, without any objectionable shocks to the vehicle operator, a shift from the preview brake control to ADR control can be made.

If there is an operator acceleration request by depressing the accelerator pedal, control goes from block 428 to blocks 426 and 416, terminating application of stand-by braking torque immediately. Thus, quick acceleration performance is provided in response to the vehicle operator acceleration request.

In the embodiment, the system keeps the stand-by brake pressure $P_{PB}$ invariable over the predetermined period of time Ts. If desired, the system may vary the stand-by brake pressure $P_{PB}$ in a manner as illustrated by the fully drawn line in FIG. 9 or by the one-dot chain line in FIG. 9. Alternatively, the system may vary the stand-by brake pressure PPB at continuously changing rates.

In the embodiment, brake switch 216 is provided to detect operator effort to manipulate brake pedal 210. If desired, stroke of the brake pedal may be relied on to detect the initiation of operator braking effort.

In the embodiment, description has been made with reference to a preceding vehicle in front. The present invention is applicable to the situation where the detection system 224 detects obstacles in the direction of the vehicle.

In the embodiment, relative speed between vehicles is determined by calculating the derivative of distance L with respect to time. If a detection system is capable of detecting the relative speed, the detected relative speed may be used.

In the embodiment, the brake booster 208 employing solenoid coil 300a is used to generate brake pressure corresponding to $P_{PB}$ or $P_{BC}(n)$. Brake actuator is not limited to such brake booster and may take any other form in implementing the present invention. For example, brake pressure corresponding to $P_{PB}$ or $P_{BC}(n)$ may be produced by regulating a system hydraulic pressure discharged by a pump.

In the embodiment, the hydraulic braking system communicating with friction brakes is used as braking devices. If desired, a braking device may be implemented by a traction motor/generator, represented generally by reference numeral 47 in FIG. 1, which applies a negative, or retarding torque when used as a braking device. The braking device may be directly coupled to one or more wheels 54-60 via an appropriate mechanical or hydraulic linkage.

In the embodiment, the automatic distance regulation (ADR) is carried out to bring the distance L into a target window expressed by $L1 \leq L \leq L2$. The present invention is not limited to this. If desired, a target vehicle-to-vehicle distance L* is determined by calculating a product of vehicle speed Vm and time that is required to reduce a distance from a preceding vehicle. Using the distance L* as a target, ADR may be carried out to reduce a deviation of an actual distance L from L* toward zero.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-043398, filed Feb. 21, 2000, the disclosure of which is hereby incorporated by reference in its entirety

What is claimed is:

1. A system for controlling speed of a vehicle, comprising:
   a prime mover coupled to at least one wheel of the vehicle for applying a positive torque to the at least one wheel in response to an accelerating signal; and
   a controller having a control logic for determining an actual distance from a preceding vehicle in front, comparing the actual distance to a set desired distance to determine whether the actual distance is greater than the desired distance, determining whether or not a stand-by braking torque is applied to the at least one wheel, determining an additional torque requested by an automatic distance regulation (ADR) to increase vehicle speed when the actual distance is greater than the desired distance and the stand-by braking torque is not applied, and generating an accelerating signal for the prime mover to apply the additional torque to the at least one wheel.

2. The system as claimed in claim 1, wherein the stand-by braking torque is applied to the at least one wheel when there is a need for operator braking action after determining whether or not there is a need for operator braking action.

3. The system as claimed in claim 1, further comprising:
   a braking device coupled to the at least one wheel for applying a braking torque to the at least one wheel in response to a braking signal, and
   a controller having a control logic for determining whether or not there is a need for operator braking action, determining a stand-by braking torque when there is a need for operator braking action, and generating a braking signal for the braking device to apply the stand-by braking torque to the at least one wheel.

4. The system as claimed in claim 3, wherein the control logic for determining whether or not there is a need for operator braking action includes:
   determining an actual distance from obstacle located in the direction of the vehicle;
   determining an actual vehicle speed;
   determining a brake pedal position;
   determining an accelerator pedal position; and
   making the determination whether or not there is a need for operator braking action based on the actual distance, the actual vehicle speed, the brake pedal position, and the accelerator pedal position.

5. The system as claimed in claim 4, wherein the control logic for determining whether or not there is a need for operator braking action includes:
   calculating a target deceleration based on the actual vehicle speed, and the actual distance;
   comparing the target deceleration to a predetermined deceleration value;
   comparing the accelerator pedal position to a predetermined accelerator pedal position value; and
   making the determination that there is a need for braking when the target deceleration exceeds the predetermined deceleration value, the brake pedal is released, and the accelerator pedal position is less than the predetermined accelerator pedal position value.

6. The system as claimed in claim 3, wherein the control logic for determining the stand-by braking torque includes:
   determining a first braking torque value as an initial value of the stand-by braking torque when an initial vehicle speed upon initiation of application of stand-by braking torque is less than a first vehicle speed value;
   determining a second braking torque value, which is greater than the first braking torque value, as an initial value of the stand-by braking torque when the initial vehicle speed is greater than a second vehicle speed value that is greater than said first vehicle speed value; and
   determining one of intermediate braking torque values, which fall between the first and second braking torque values, as an initial value of the stand-by braking torque when the initial vehicle speed is greater than the first vehicle speed value but less than the second vehicle speed value.

7. The system as claimed in claim 6, wherein the intermediate braking torque values are represented by a linear function of the vehicle speed.

8. The system as claimed in claim 7, wherein, at least over a range of vehicle speed values that fall between the first and second vehicle speed values, the heavier the weight of the vehicle, the greater the initial value of the stand-by braking torque is.

9. The system as claimed in claim 3, wherein the stand-by braking torque is invariable for a predetermined time.

10. The system as claimed in claim 3, wherein the stand-by braking torque decreases at a predetermined rate since the determination was made that there was a need for operator braking action.

11. The system as claimed in claim 3, wherein the stand-by braking torque decreases at a first predetermined rate for the predetermined time since the determination was made that there was a need for operator braking action, and at a second predetermined rate that is greater than the first predetermined rate after elapse of the predetermined period of time.

12. A system for controlling speed of a vehicle, comprising:
    a braking device coupled to the at least one wheel for applying a braking torque to at least one wheel in response to a braking signal, and
    a controller having a control logic for determining whether or not there is a need for operator braking action, determining a stand-by braking torque when there is a need for operator braking action, determining whether or not there is operator acceleration request, generating a braking signal for the braking device to apply the stand-by braking torque to the at least one wheel, and terminating application of the stand-by braking torque when there is operator acceleration request.

13. The system as claimed in claim 12, wherein the step of determining whether or not there is a need for operator braking action includes:
    determining an actual distance from obstacle located in the direction of the vehicle;
    determining an actual vehicle speed;
    determining a brake pedal position;
    determining an accelerator pedal position; and
    making the determination whether or not there is a need for operator braking action based on the actual distance, the actual vehicle speed, the brake pedal position, and the accelerator pedal position.

14. The system as claimed in claim 13, wherein the step of determining whether or not there is a need for operator braking action includes:
    calculating a target deceleration based on the actual vehicle speed, and the actual distance;
    comparing the target deceleration to a predetermined deceleration value;
    comparing the accelerator pedal position to a predetermined accelerator pedal position value; and
    making the determination that there is a need for braking when the target deceleration exceeds the predetermined deceleration value, the brake pedal is released, and the accelerator pedal position is less than the predetermined accelerator pedal position value.

15. The system as claimed in claim 12, wherein the step of determining the stand-by braking torque includes:
    determining a minimum braking torque value as an initial value of the stand-by braking torque when a measure of the vehicle speed at moment upon determination that there is a need for operator braking action is less than a first vehicle speed value;
    determining a maximum braking torque value, which is greater than the first braking torque value, as an initial value of the stand-by braking torque when the measure of the vehicle speed at moment upon determination that there is a need for operator braking action is greater than a second vehicle speed value that is greater than said first vehicle speed value; and
    determining one of intermediate braking torque values, which fall between the minimum and maximum braking torque values, as an initial value of the stand-by braking torque when the measure of the vehicle speed at moment upon determination that there is a need for operator braking action is greater than said first vehicle speed value but less than said second vehicle speed value.

16. The system as claimed in claim 15, wherein the intermediate braking torque values are represented by a linear function of the vehicle speed.

17. The system as claimed in claim 16, wherein, at least over a range of vehicle speed values that fall between the first and second vehicle speed values, the heavier the weight of the vehicle, the greater the initial value of the stand-by braking torque is.

18. The system as claimed in claim 12, wherein the stand-by braking torque is invariable for a predetermined time.

19. The system as claimed in claim 12, wherein the stand-by braking torque decreases at a predetermined rate since the determination was made that there was a need for operator braking action.

20. The system as claimed in claim 12, wherein the stand-by braking torque decreases at a first predetermined rate for the predetermined time since the determination was made that there was a need for operator braking action, and at a second predetermined rate that is greater than the first predetermined rate after elapse of the predetermined period of time.

21. A computer readable storage medium having stored data representing instructions readable by a computer to control speed of a vehicle, the computer readable storage medium comprising:
    instructions for determining an actual distance from a preceding vehicle in front;
    instructions for comparing the actual distance to a set desired distance to determine whether the actual distance is greater than the desired distance;
    instructions for determining whether or not a stand-by braking torque is applied to the at least one wheel;
    instructions for determining an additional torque requested by an automatic distance regulation (ADR) to increase vehicle speed when the actual distance is greater than the desired distance and the stand-by braking torque is not applied; and
    instructions for applying the additional torque to at least one wheel of the vehicle.

22. A computer readable storage medium having stored data representing instructions readable by a computer to control speed of a vehicle, the computer readable storage medium comprising:
    instructions for determining whether or not there is a need for operator braking action;
    instructions for determining a stand-by braking torque when there is a need for operator braking action;
    instructions for determining whether or not there is operator acceleration request;
    instructions for applying the stand-by braking torque to at least one wheel of the vehicle; and
    instructions for terminating application of the stand-by braking torque when there is operator acceleration request.

23. A method for controlling speed of a vehicle, comprising:
    determining whether or not there is a need for operator braking action;
    determining whether or not there is operator acceleration request;
    determining a stand-by braking torque when there is a need for operator braking action;
    applying the stand-by braking torque to at least one wheel of the vehicle to reduce vehicle speed of the vehicle;

terminating application of the stand-by braking torque when there is operator acceleration request;

determining an actual distance from a preceding vehicle in front;

comparing the actual distance to a set desired distance to determine whether the actual distance is greater than the desired distance;

determining whether or not a stand-by braking torque is applied to the at least one wheel;

determining an additional torque requested by an automatic distance regulation (ADR) to increase vehicle speed when the actual distance is greater than the desired distance and the stand-by braking torque is not applied; and applying the additional torque to the at least one wheel to increase vehicle speed of the vehicle.

24. A system for controlling speed of a vehicle, comprising:

a detection system to detect environmental data in front of the vehicle;

operator demand sensors to detect vehicle operator request;

a prime mover coupled to at least one wheel of the vehicle for applying a positive torque to the at least one wheel in response to an accelerating signal;

a braking device coupled to the at least one wheel for applying a braking torque to at least one wheel in response to a braking signal; and controller means having a control logic for determining whether or not there is a need for operator braking action;

determining whether or not there is operator acceleration request;

determining a stand-by braking torque when there is a need for operator braking action;

generating a braking signal for the braking device to apply the stand-by braking torque to the at least one wheel of the vehicle to reduce vehicle speed of the vehicle;

terminating application of the stand-by braking torque when there is operator acceleration request;

determining an actual distance from a preceding vehicle in front;

comparing the actual distance to a set desired distance to determine whether the actual distance is greater than the desired distance;

determining whether or not a stand-by braking torque is applied to the at least one wheel;

determining an additional torque requested by an automatic distance regulation (ADR) to increase vehicle speed when the actual distance is greater than the desired distance and the stand-by braking torque is not applied; and generating an acceleration signal for the primer mover to apply the additional torque to the at least one wheel to increase speed of the vehicle.

* * * * *